(12) United States Patent
Xie et al.

(10) Patent No.: US 10,044,601 B2
(45) Date of Patent: Aug. 7, 2018

(54) TRANSMISSION OF BROADCAST COMMUNICATION

(71) Applicant: Avago Technologies General IP (Singapore) Pte. Ltd., Singapore (SG)

(72) Inventors: Guoxin Xie, San Diego, CA (US); Chikan Kwan, San Diego, CA (US); Shawn Ding, San Diego, CA (US); Jun Guo, San Diego, CA (US); Yuan Zhuang, San Diego, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 32 days.

(21) Appl. No.: 15/087,357

(22) Filed: Mar. 31, 2016

(65) Prior Publication Data
US 2017/0141999 A1 May 18, 2017

Related U.S. Application Data

(60) Provisional application No. 62/255,302, filed on Nov. 13, 2015.

(51) Int. Cl.
*H04L 12/761* (2013.01)
*H04W 4/80* (2018.01)
*H04L 12/841* (2013.01)

(52) U.S. Cl.
CPC ............. *H04L 45/16* (2013.01); *H04L 47/28* (2013.01); *H04W 4/80* (2018.02)

(58) Field of Classification Search
CPC ........... H04L 45/16; H04L 47/28; H04W 4/80
See application file for complete search history.

(56) References Cited

U.S. PATENT DOCUMENTS

| 5,805,576 A * | 9/1998 | Worley, III | H04W 88/085 370/337 |
| 6,760,340 B1 * | 7/2004 | Banavar | H04L 12/1868 370/394 |
| 9,265,080 B1 * | 2/2016 | Palin | H04W 76/023 |
| 2003/0204616 A1 * | 10/2003 | Billhartz | H04L 45/302 709/235 |
| 2005/0222933 A1 * | 10/2005 | Wesby | G06Q 40/00 705/36 R |
| 2013/0034045 A1 * | 2/2013 | Kwon | H04L 41/12 370/315 |

(Continued)

OTHER PUBLICATIONS

Bluetooth Specification Version 4.2, vols. 0-7, Bluetooth SIG, Inc., Dec. 2, 2014.

*Primary Examiner* — Omar J Ghowrwal
(74) *Attorney, Agent, or Firm* — Sterne, Kessler, Goldstein & Fox P.L.L.C.

(57) ABSTRACT

A multi-cast multi-poll scheme for BLUETOOTH low energy (BLE) technology to be used by one or more mobile devices within a communication environment is disclosed. A broadcaster communication device comprises a transceiver that is configured to communicate with a plurality of recipient communication devices. The broadcaster communication device further comprises a controller that is configured to transmit a packet to the plurality of recipient communication devices and to receive, at predefined time intervals, responses from the plurality of recipient communication devices according to a pre-negotiated order without transmitting any additional packets.

20 Claims, 9 Drawing Sheets

(56) References Cited

U.S. PATENT DOCUMENTS

| | | | |
|---|---|---|---|
| 2013/0331031 A1* | 12/2013 | Palin | H04W 52/0245 455/41.2 |
| 2014/0064296 A1* | 3/2014 | Haeupler | H04L 49/90 370/412 |
| 2014/0355517 A1* | 12/2014 | Reunamaki | H04W 8/005 370/328 |
| 2015/0263784 A1* | 9/2015 | Gacanin | H04B 3/36 375/211 |
| 2015/0341878 A1* | 11/2015 | Lee | H04W 56/004 370/329 |
| 2015/0350279 A1* | 12/2015 | Palin | H04L 65/80 370/328 |
| 2016/0066353 A1* | 3/2016 | Kumar | H04W 76/021 709/227 |
| 2016/0100311 A1* | 4/2016 | Kumar | H04L 63/123 726/7 |
| 2016/0157078 A1* | 6/2016 | Palin | H04W 8/005 455/41.2 |
| 2016/0165533 A1* | 6/2016 | Yang | H04W 76/02 455/434 |
| 2016/0295453 A1* | 10/2016 | Minamiyama | H04W 40/02 |
| 2017/0078382 A1* | 3/2017 | Prakash | H04W 8/186 |
| 2017/0134912 A1* | 5/2017 | Jurzak | H04W 4/08 |

* cited by examiner

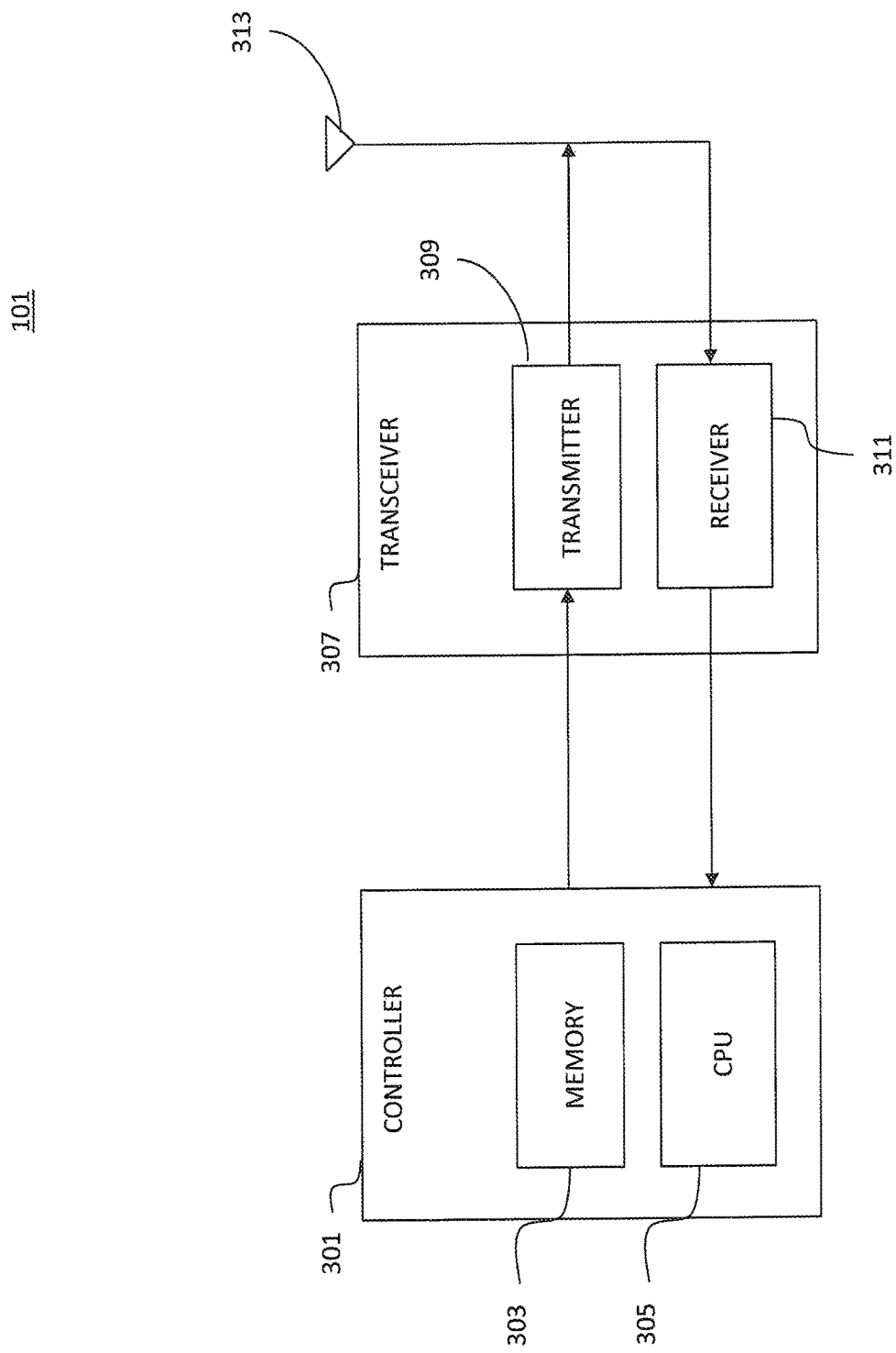

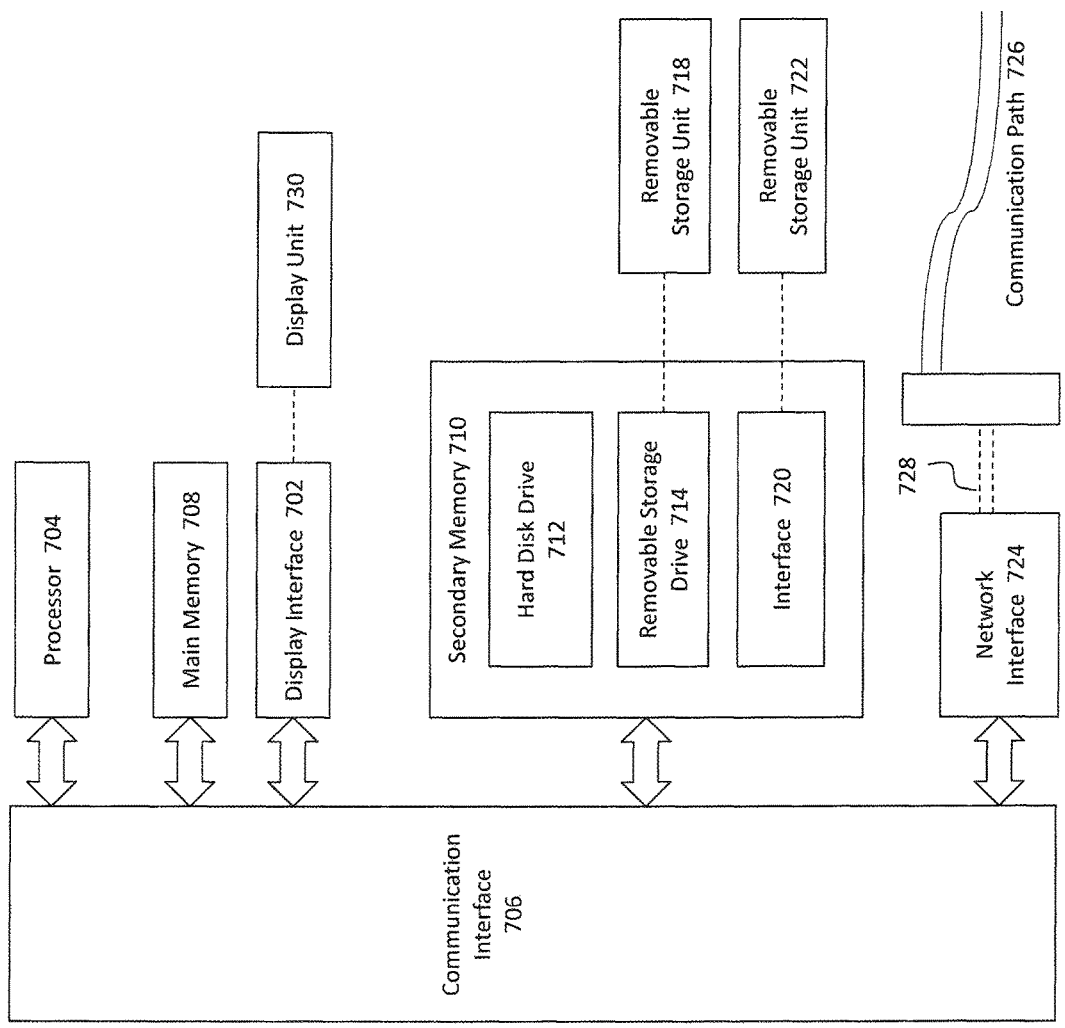

TRANSMISSION OF BROADCAST COMMUNICATION

CROSS REFERENCE TO RELATED APPLICATIONS

The present application claims the benefit of U.S. Provisional Patent Application No. 62/255,302, filed on Nov. 13, 2015, which is hereby incorporated by reference in its entirety.

BACKGROUND

Field

This application relates generally to wireless communications, including a multi-cast multi-poll scheme for BLUETOOTH Low energy (BLE) technology to be used by one or more mobile devices within a communication environment.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 3 illustrates a recipient (e.g., a slave device, a peripheral device) according to an exemplary embodiment of the present disclosure.

FIG. 7 illustrates a computer system that can be utilized to implement one or more embodiments of the present disclosure.

The embodiments of the present disclosure will be described with reference to the accompanying drawings. The drawing in which an element first appears is typically indicated by the leftmost digit(s) in the corresponding reference number.

DETAILED DESCRIPTION

Overview

Figure 1:
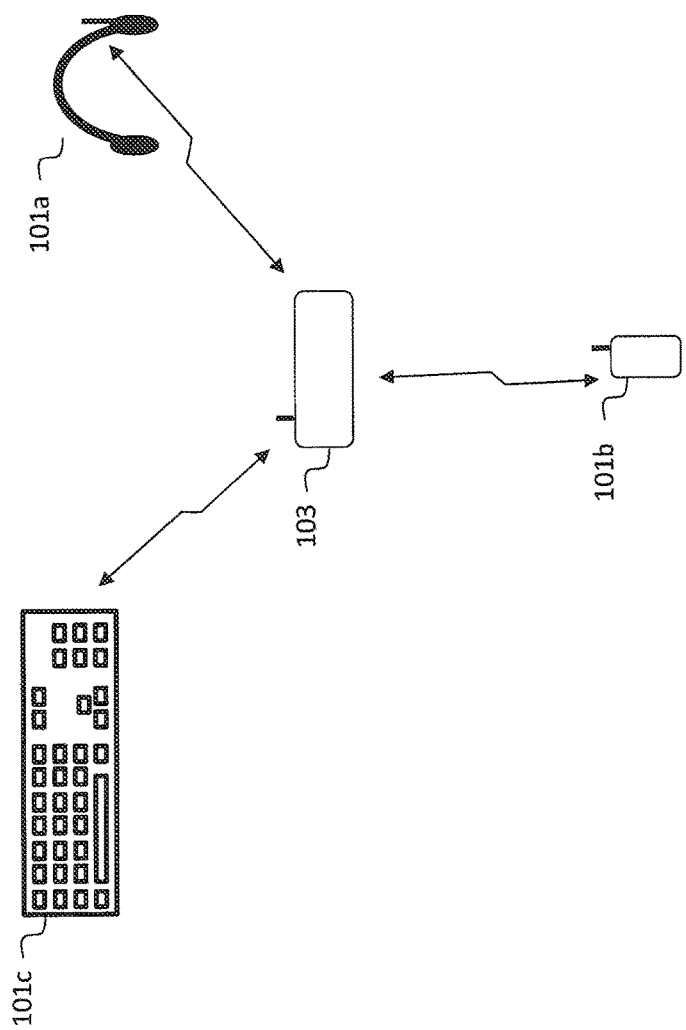
FIG. 1 illustrates an example network environment.

Apparatus and methods are provided for a multi-cast multi-poll scheme. According to an embodiment, a broadcaster communication device is disclosed that includes a transceiver configured to communicate with a plurality of recipient communication devices. The broadcaster communication device further includes a controller that is configured to transmit a packet to the plurality of recipient communication devices and to receive, at predefined time intervals, responses from the plurality of recipient communication devices according to a pre-negotiated order without transmitting any additional packets.

According to another embodiment, a recipient communication device is provided that includes a radio transceiver and a control logic. The radio transceiver is configured to communicate with a broadcaster communication device. The control logic is configured to receive a packet from the broadcaster communication device and to transmit, at a predefined time interval based on a pre-negotiated order, a response to the broadcaster communication device without receiving any additional packets from the broadcaster communication device.

According to another embodiment, a method for a broadcaster communication device to communicate with a plurality of recipient communication devices is disclosed. The method includes transmitting a packet to the plurality of recipient communication devices. The method further includes receiving, at predefined time intervals, responses from the plurality of recipient communication devices according to a pre-negotiated order without transmitting any additional packets.

According to another embodiment, a method for a recipient communication device to communicate with a broadcaster communication device is disclosed. The method includes receiving a packet from the broadcaster communication device. The method further includes transmitting, at a predefined time interval based on a pre-negotiated order, a response to the broadcaster communication device without receiving any additional packets from the broadcaster communication device.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced, or skilled in the art to most effectively convey the substance of their work to others skilled in the art. In other instances, well-known methods, procedures, components, and circuitry have not been described in detail to avoid unnecessarily obscuring aspects of the disclosure.

In the following disclosure, terms defined by the Long-Term Evolution (LTE) standard are sometimes used. For example, the term "eNodeB" or "eNB" is used to refer to what is commonly described as a base station (BS) or a base transceiver station (BTS) in other standards. The term "User Equipment (UE)" is used to refer to what is commonly described as a mobile station (MS) or mobile terminal in other standards. The LTE standard is developed by the 3rd Generation Partnership Project (3GPP) and described in the 3GPP specification and International Mobile Telecomunnications-2000 (IMT-2000) standard, all of which are incorporated by reference in their entirety. Further, although exemplary embodiments are described with reference to LTE, the more generic terms "mobile device" and "base station" are used herein except where otherwise noted to refer to the LTE terms "User Equipment (UE)" and "eNodeB/eNB," respectively.

As will be apparent to one of ordinary skill in the relevant art(s) based on the teachings herein, exemplary embodi ments are not limited to the LTE standard, and can be applied to other cellular communication standards, including (but not limited to) Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (CPRS), Enhanced Data Rates for GSM Evolution (EDGE), and Worldwide Interoperability for Microwave Access (WIMAX) (IEEE 802.16) to provide some examples. Further, exemplary embodiments are not limited to cellular communication networks and can be used or implemented in other kinds of wireless communication access networks, including (but not limited to) WEAN (IEEE 802.11), BLUETOOTH, Near-field Communication (NFC) (ISO/IEC 18092), ZIGBEE (IEEE 802.15.4), and/or Radio-frequency identification (RFID), to provide some examples. These various standards and/or protocols are each incorporated by reference in their entirety.

FIG. 1 illustrates an example communication environment 100 that includes a broadcaster communication, device (e.g., a master device, an organizer device, broadcaster device) 103, and one or more recipient communication devices (e.g., slave devices, peripheral devices, recipient devices) 101. Recipient devices 101 and broadcaster device 103 each include suitable logic, circuitry, and/or code that is configured to communicate via one or more wireless technologies. According to one example, recipient devices 101 can include a headset 101a, a mobile device 101b, a keyboard 101c, etc., that can communicate with each other and/or with broadcaster device 103. Mobile device 101b can further be configured to support co-existing wireless communications. Mobile device 101b can include, for example, a transceiver having suitable logic, circuitry, and/or code that is configured to transmit and/or receive wireless communications via one or more wireless technologies within the communication environment 100. Broadcaster device 103 (and/or recipient devices 101) can include a mobile device, a base station, an access point, etc. In one example, broadcaster device 103 (and/or recipient devices 101) can include a base station and/or an access point and can each include suitable logic, circuitry, and/or code that is configured to: (1) receive one or more wired communications via one or more well-known wired technologies (e.g., within a core (backhaul) network) and transmit one or more corresponding wireless communications via one or more wireless technologies within the communication environment 100, (2) receive one or more wireless communications within the communication environment 100 via one or more wireless technologies and transmit one or more corresponding wired communications via one or more well-known wired technologies within a core network, and (3) to transmit and/or receive wireless communications via one or more wireless technologies within the communication environment 100. The wireless technologies can include one or more wireless protocols discussed above.

The mobile device 101b can be configured to communicate with a base station in a serving cell or sector of the communication environment 100, and/or to communicate with an access point (AP) in a wireless local area network (WLAN). For example, the mobile device 101b receives signals on one or more downlink (DL) channels and transmits signals to the base station and/or the AP on one or more respective uplink (UL) channels. In an exemplary embodiment, the base station includes suitable logic, circuitry, and/or code that is configured for communications conforming to 3GPP's Long-Term Evolution (LTE) specification (e.g., the base station is an LTE base station), the AP includes suitable logic, circuitry, and/or code that is configured for communications conforming to IEEE's 802.11 WLAN specification (e.g., the AP is a WLAN access point), and the mobile device 101b includes suitable logic, circuitry, and/or code that is configured for communications conforming to 3GPP's LTE specification and IEEE's 802.11 WLAN specification. That is, mobile device 101b includes suitable logic, circuitry, and/or code is configured to wirelessly communicate with the base station utilizing 3GPP's LTE specification and with the AP utilizing IEEE's 802.11 WLAN specification. Here, the serving cell or sector can be an LTE serving cell or sector and the WLAN can be a WLAN utilizing the 802.11 WLAN specification.

Examples of mobile device 101b include (but are not limited to) a mobile computing device—such as a laptop computer, a tablet computer, a mobile telephone or smartphone, a "phablet," a personal digital assistant (PDA), mobile media player, and the like; and a wearable computing device—such as a computerized wrist watch or "smart" watch, computerized eyeglasses, and the like. In some embodiments, mobile device 101b may be a stationary device, including, for example, a stationary computing device—such as a personal computer (PC), a desktop computer, a computerized kiosk, an automotive/aeronautical/maritime in-dash computer terminal, and the like.

Although headset 101a, mobile device 101b, and keyboard 101e are shown as examples of recipient devices 101, it is noted that recipient devices 101 can include many different devices. In one example, recipient devices can include devices configured to operate using BLUETOOTH Low Energy (BLE) technology (also known as BLUETOOTH Smart). Recipient devices can include, but not limited to, devices used in healthcare technologies, security devices, home appliances, home entertainment devices, fitness devices, sensors etc. According to one example, the BLE technology is used to provide low power consumption and low cost and maintaining the same communication range at BLUETOOTH technology.

According to one embodiment, communication environment 100 can include a BLUETOOTH and/or BLUETOOTH Low Energy (BLE) subsystem that provides wireless communication between the BLE capable recipient devices 101 and BLE capable broadcaster device 103 in accordance with various BLUETOOTH or BLUETOOTH Low Energy (BLE) standards. Communication environment 100 is configurable to operate in a master mode of operation to initiate communications with another BLUETOOTH capable device or in a slave mode of operation to receive communications from another BLUETOOTH capable device.

According to one example, a multi-cast multi-poll scheme is disclosed where broadcaster device 103 and recipient devices 101 can be synchronized such that they will be able to listen to each other. According to one embodiment, broadcaster device 103 can be configured to transmit a packet to recipient devices 101. Broadcaster device 103 is further configured to receive, at a predefined and predetermined time interval, responses from the recipient devices 101 according to a pre-negotiated order without transmitting any additional packets. In other words, a predetermined and predefined order and timing is negotiated between broadcaster device 103 and recipient devices 101. According to one embodiment, whenever broadcaster device 103 would like to, for example, determine whether all recipient devices are still connected, broadcaster device 103 can transmit a message to all recipient devices 101. In one example, the transmitted message can be based on a pre-negotiated format such that recipient devices 101 would know that they have to respond based on the multi-cast multi-poll scheme discussed herein. When recipient devices 101 receive this message, they will start to transmit their responses based on the pre-negotiated order and timing, Broadcaster device 103 and other recipient devices are configured to "listen" for and receive the response packet for the recipient devices that is supposed to respond based on the pre-negotiated order and timing.

Figure 2:
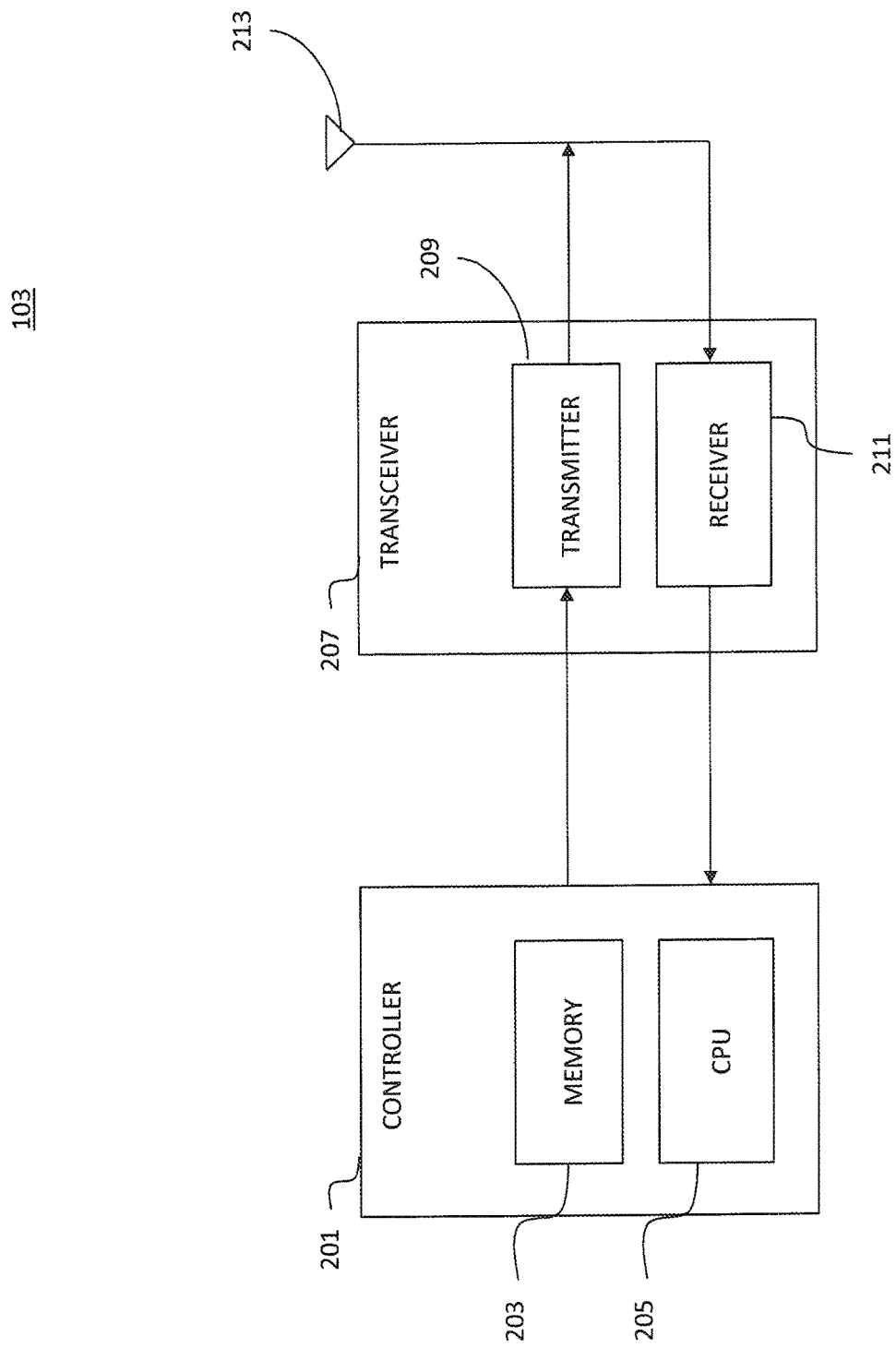
FIG. 2 illustrates a broadcaster (e.g., a master device, an organizer device, a central device) according to an exemplary embodiment of the present disclosure.

FIG. 2 illustrates broadcaster device 103 according to an exemplary embodiment of the present disclosure. For example, broadcaster device 103 can include a transceiver 207 communicatively coupled to a controller 201.

The transceiver 207 includes suitable logic, circuitry, and/or code that is configured to transmit and/or receive wireless communications via one or more wireless technologies within the communication environment 100. According to one example, transceiver 207 is configured to transmit and/or receive wireless communications in accordance BLUETOOTH or BLUETOOTH Low Energy (BLE) standards. In particular, the transceiver 207 can include a transmitter 209 and a receiver 211 that have suitable logic, circuitry, and/or code configured to transmit and receive wireless communications, respectively, via one or more antennas 213. Those skilled in the relevant art(s) will recognize that the processes for transmitting and/or receiving wireless communications can include (but are not limited to) digital signal processing using a digital signal processor (DSP), modulation and/or demodulation of data using a respective modulator or and/or demodulator, digital-to-analog and/or analog-to-digital conversion using a respective digital-to analog converter (DAC) or analog-to-digital converter (ADC), and/or frequency conversion using one or more mixers, local oscillators, to provide some examples. Further, those skilled in the relevant art(s) will recognize that the antenna 213 may include an integer array of antennas, and that the antenna 213 may be capable of both transmitting and receiving wireless communication signals. For example, broadcaster device 213 can be configured for wireless communication utilizing a Multiple-input Multiple-output (MIMO) configuration. In addition to BLUETOOTH or BLUETOOTH Low Energy (BLE) standards, in an exemplary embodiment, the transceiver 207 can be configured for wireless communications conforming to one or more wireless protocols defined by 3GPP (e.g., 3GPP's LTE specification) or one or more non-3GPP protocols (e.g., IEEE's 802.11 WLAN specification).

Although one transceiver and one antenna are shown, those skilled in the relevant art(s) will recognize that broadcaster device 103 can include one or more transceivers and/or one or more antennas that can be used in accordance to one or more communication protocols and/or standards. Additionally or alternatively one transceiver and/or one antenna could be used in accordance to one or more communication protocols and/or standards.

The controller 201 includes suitable logic, circuitry, and/or code that is configured to control the overall operation of broadcaster device 103, including the operation of the transceiver 207. The controller 201 can include one or more processors (CPUs) 205 configured to carry out instructions to perform arithmetical, logical, and/or input/output (I/O) operations of broadcaster device 103 and/or one or more components of broadcaster device 103. The controller 201 can further include a memory 203 that includes suitable logic, circuitry, and/or code that is configured to store data and/or instructions, including instructions that when executed by processor 205 perform the functionality described herein. The memory 203 can be any well-known volatile and/or non-volatile memory, including, for example, read-only memory (ROM), random access memory (RAM), flash memory, a magnetic storage media, an optical disc, erasable programmable read only memory (EPROM), programmable read only memory (PROM) and the like. The memory 260 can be non-removable, removable, or a combination of both.

FIG. 3 illustrates recipient device 101 according to an exemplary embodiment of the present disclosure. Recipient device 101 can include a controller 301 communicatively coupled to a transceiver 307. Recipient device 101 can be configured for wireless communications conforming to one or more wireless protocols defined by BLUETOOTH and/or BLUETOOTH Low Energy standards. Recipient device 101 can also be configured for wireless communications conforming to one or more wireless protocols 3GPP (e.g., 3GPP's LTE specification) and/or one or more non-3GPP wireless protocols (e.g., IEEE's 802.11 WLAN specification). Those skilled in the relevant art(s) will understand that recipient device 101 is not limited to these exemplary protocols, and recipient device 101 can be configured for wireless communications conforming to one or more other wireless protocols in addition to, or in the alternative to, the wireless protocols discussed herein.

The transceiver 307 includes suitable logic, circuitry, and/or code that is configured for transmitting and/or receiving wireless communications conforming to, for example, but not limited to, BLUETOOTH and/or BLUETOOTH Low Energy standards. In particular, the transceiver 307 can include a transmitter 309 and a receiver 311 that have suitable logic, circuitry, and/or code configured for transmitting and receiving wireless communications conforming to, for example, BLUETOOTH and/or BLUETOOTH Low Energy standards, respectively, via one or more antennas 313. Transceiver 307 need not be limited to BLUETOOTH and/or BLUETOOTH Low Energy standards, and could operate according to another wireless standard, as will be understood by those skilled in art.

Regarding transceiver 307, the processes for transmitting and/or receiving wireless communications can include (but are not limited to): digital signal processing using a digital signal processor (DSP), modulation and/or demodulation of data using for using a respective modulator or demodulator, digital-to-analog conversion and/or analog-to-digital conversion using a respective DAC or ADC, and/or frequency conversion using various mixers and local oscillators to provide some examples. Further, those skilled in the relevant art(s) will recognize that antenna 313 may include an integer array of antennas, and that the antennas may be capable of both transmitting and receiving wireless communication signals. Also, although one transceiver and one antenna are shown, those skilled in the relevant art(s) will recognize that recipient device 101 can include one or more transceivers and/or one or more antennas that can be used in accordance to one or more communication protocols and/or standards. Additionally or alternatively one transceiver and/or one antenna could be used in accordance to one or more communication protocols and/or standards.

The controller 301 includes suitable logic, circuitry, and/or code that is configured to control the overall operation of recipient device 101, including the operation of transceiver 307. Controller 301 can include one or more processors (CPUs) 305 configured to carry out instructions to perform arithmetical, logical, and/or input/output (I/O) operations of recipient device 101 and/or one or more components of recipient device 101. The controller 301 can further include a memory 303 that is similar to memory 203, and includes suitable logic, circuitry, and/or code that is configured to store data and/or instructions, including instructions that when executed by processor 305 perform the functionality described herein. Similarly, the memory 303 can be any well-known volatile and/or non-volatile memory, and can be non-removable, removable, or a combination of both.

Although the broadcaster device and the recipient devices are shown as different devices, a recipient device can also be configured as a broadcaster device if, for example, the original broadcaster device is disconnected or leaves the broadcasting group.

Figure 4A:
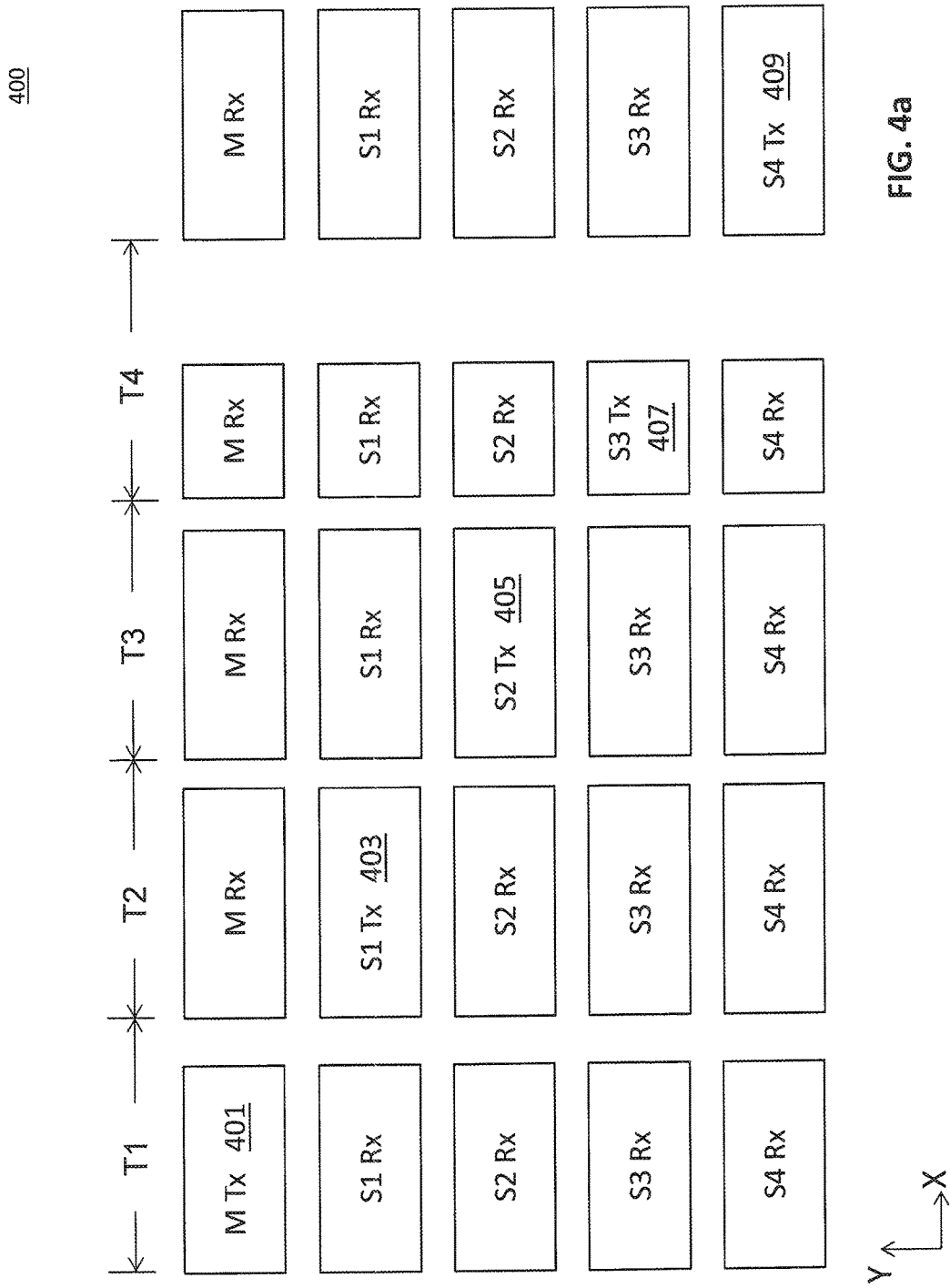
FIG. 4a illustrates a timing of packet transmission and reception according to an exemplary embodiment of the present disclosure.

FIG. 4a illustrates a timing of packet transmission and reception according to an exemplary embodiment of the present disclosure. According to this example, the X axis represents time and the Y axis represents packets sent and received by the broadcaster device and/or recipient devices. The timing diagram 400 is described with continued reference to FIGS. 1-3. The steps of timing diagram 400 are not limited to the order described below, and the various steps may be performed in a different order.

According to one example, broadcaster device 103 is configured to transmit a packet 401 that can be received by the recipient devices 101. In this example, a broadcaster device M transmits packet 401 and recipient devices S1, S2, S3, and S4 receive the packet that was transmitted by broadcaster device M. In one example, the transmitted packet 401 can be based on a pre-negotiated format such that recipient devices S1, S2, S3, and S4 would know that they have to respond based on the multi-cast multi-poll scheme discussed herein. After receiving the packet 401, the recipient devices start to respond to this packet based on a pre-negotiated scheme or schedule. The recipient devices respond to this packet based on the pre-negotiated scheme or schedule without broadcaster device 103 transmitting any additional packets. In other words, in the multi-cast multi-poll scheme discussed herein, broadcaster device 103 is configured to communicate with all recipient devices S1, S2, S3, and S4 with packet 401 and receive all the recipient devices' responses without transmitting any additional packets. According to one example, the response packets sent by the recipient devices can include some data that the recipient devices would like to send to the broadcaster device. Additionally or alternatively, the response packets sent by the recipient devices can include just an acknowledgment packet to acknowledge the receipt of packet 401. The response packets sent by the recipient devices can include a packet type as acknowledgment. The response packets sent by the recipient devices can have zero-length acknowledgement (i.e., Ack with no additional data) or non-zero-length (data). In combination of the above examples and/or other formats can be used by the recipient devices as the response packets.

According to exemplary embodiment of FIG. 4a, recipient device S1 transmits a packet 403 in response to packet 401 transmitted by broadcaster device M. Recipient device S1 transmits packet 403 based on a pre-negotiated order that indicates that recipient device S1 would be the first recipient device to respond to packet 401. Further, the time interval for recipient device S1 to transmit packet 403 can also be pre-negotiated and predefined. As discussed above, packet 403 can include data that recipient device S1 desires to send to broadcaster M. Additionally or alternatively, packet 403 can include an acknowledgment to acknowledge the recipient of packet 401. Packet 403 can include other data for communication between recipient device S1 and broadcaster device M. When recipient device S1 transmits packet 403, broadcaster device M is configured to receive packet 403 during the predetermined time interval for recipient device S1. Additionally, other recipient devices S2, S3, and S4 can also be configured to receive packet 403 if they are authorized to receive the packet. This authorization can be pre-negotiated between broadcaster device M and recipient devices S1, S2, S3, and S4.

According to exemplary embodiment of FIG. 4a, recipient device S2 transmits a packet 405 after recipient device S1 transmits packet 403. As discussed above, the order of recipient to transmit packets can be pre-negotiated. Further, the time interval for recipient device S2 to transmit packet 405 can also be pre-negotiated and predefined. When recipient device S2 transmits packet 405, broadcaster device M is configured to "listen" for and receive packet 405 during the predetermined time interval for recipient device S2. Additionally, other recipient devices S1, S3, and S4 can also be configured to "listen" for and receive packet 405 if they are authorized to receive the packet.

Next, recipient device S3 transmits a packet 407 during its predetermined time interval, after recipient device S2 transmits packet 405. When recipient device S3 transmits packet 407, broadcaster device M is configured to "listen" for and receive packet 407 during the predetermined time interval for recipient device S3. Additionally, other recipient devices S1, S2, and S4 can also be configured to "listen" for and receive packet 407 if they are authorized to receive the packet. According to one example, packets 401, 403, 405, and 407 can have different sizes. For example, as illustrated in FIG. 4a, packet 407 has a smaller size than packets 401, 403, and 405. Continuing with this example, recipient device S4 transmits a packet 409 during its predetermined time interval after recipient device S3 transmits packet 407. When recipient device S4 transmits packet 409, broadcaster device M is configured to "listen" for and receive packet 409 during the predetermined time interval for recipient device S4. Additionally, other recipient devices S1, S2, and S3 can also be configured to "listen" for and receive packet 409 if they are authorized to receive the packet. This multi-cast multi-poll process can be repeated every time broadcaster device M desires to check whether recipient devices can receive packets sent by broadcaster device M. Additionally or alternatively, the multi-east multi-poll process can be perforated on scheduled periods. Also, it is noted that although only one broadcaster device and four recipient devices are shown, any number of broadcaster devices and recipient devices can be used.

According to one example, the time between the beginning of each packet transmission can be preconfigured to be the same, e.g. a fixed time between the respective transmissions. This is illustrated as times T1, T2, T3, and T4 in FIG. 4a. In one example T1=T2=T3=T4. In one example, times T1=T2=T3=T4 can be 312.5 µs, which is a half slot time in the BLUETOOTH standard. Alternatively, times T1=T2=T3=T4 can be 625 µs, which is one slot time in the BLUETOOTH standard. In one example, each transmission and/or reception by recipient devices S1, S2, S3, and S4 can start at half slot boundary of the BLUETOOTH standard. Alternatively, each transmission and/or reception by recipient devices S1, S2, S3, and S4 can start at the slot boundary of the BLUETOOTH standard. According to one example, 625 µs is the length of one BLUETOOTH slot. Although it is a rational choice to use timing between beginning of transmission and reception to be half or one slot, it is not limited to those timings. In one example, the transmission by broadcaster device M to recipient devices S1, S2, S3, and S4 can start at frame boundary. As shown in FIG. 4a, although the time between the transmissions can be fixed, the packets transmitted during each time can be smaller than the fixed time. For example, packet 407 transmitted by recipient device S3 is shown to be smaller than the dedicated time T4 for that transmission.

Additionally or alternatively, the time between the beginning of each packet transmission does not need to be the same. In other words, T1, T2, T3, and T4 can have different values. According to one example, the order of the recipient devices to transmit their packets, the time between each transmission, whether other recipient devices are authorized to receive packets sent by another recipient devices, the characteristics of packet 401 transmitted by broadcaster device, etc. can be negotiated before this multi-cast multi-poll scheme starts.

The methodology described in FIG. 4a can also be applied to the BLUETOOTH protocol. A BLUETOOTH master can broadcast its packet to multiple of slaves and listen for the slave responses in the following slots. The slaves respond to the master in a pre-negotiated order in the same way as what's described in the previous paragraph for BLE protocol.

Figure 4B:
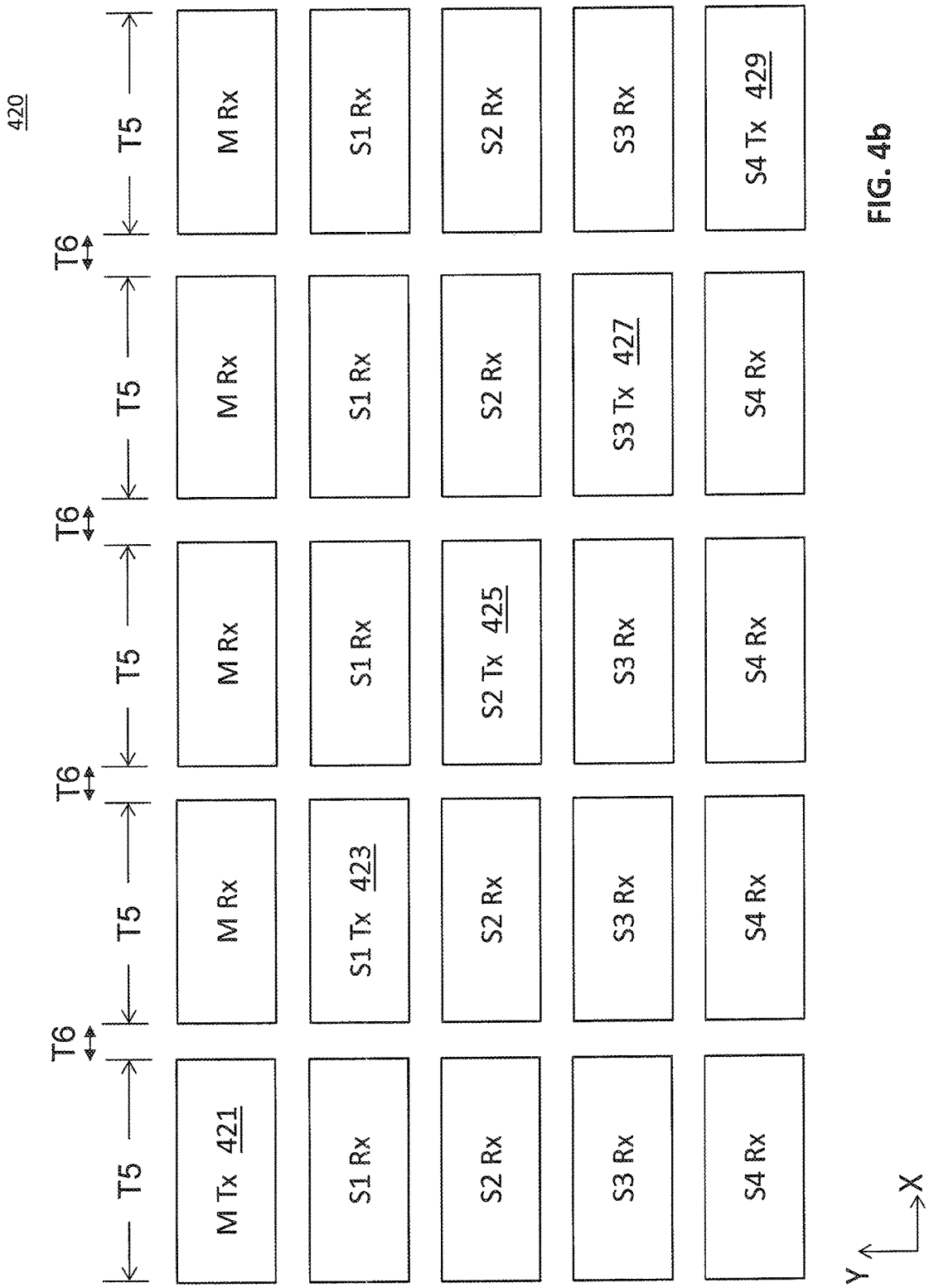
FIG. 4b illustrates a timing of packet transmission and reception according to another exemplary embodiment of the present disclosure.

FIG. 4b illustrates a timing of packet transmission and reception according to another exemplary embodiment of the present disclosure. According to this example, the X axis represents time and the Y axis represents packets sent and received by the broadcaster device and/or recipient devices. The timing diagram 420 is described with continued reference to FIGS. 1-3. The steps of timing diagram 420 are not limited to the order described below, and the various steps may be performed in a different order.

Timing diagram 420 of FIG. 4b is similar to timing diagram 400 of FIG. 4a. According to the exemplary timing diagram 420, broadcaster device M first transmits a packet 421 to be acknowledged by recipient devices S1, S2, S3, and S4. According to this example, the recipient devices S1, S2, S3, and S4 receive packet 421 and transmit packets back to broadcaster device M based on a pre-negotiated scheme. The recipient devices respond to packet 421 based on the pre-negotiated scheme or schedule without broadcaster device 103 transmitting any additional packets. In other words, in the multi-cast multi-poll scheme discussed herein, broadcaster device 103 is configured to communicate with all recipient devices S1, S2, S3, and S4 with packet 421 and receive all the recipient devices' responses without transmitting any additional packets. For example, first recipient device S1 transmits packet 423 to broadcaster device M, which is configured to receive this packet. Other recipient devices S2, S3, and S4 can also receive packet 423 if they are authorized to receive packets from other recipient devices. Next, recipient device S2 transmits packet 425 to broadcaster device M, which is configured to receive this packet. Other recipient devices S1, S3, and S4 can also receive packet 425 if they are authorized to receive packets from other recipient devices. Then, recipient device S3 transmits packet 427 to broadcaster device M, which is configured to receive this packet. Other recipient devices S1, S2, and S4 can also receive packet 427 if they are authorized to receive packets from other recipient devices. Finally, recipient device S4 transmits packet 429 to broadcaster device M, which is configured to receive this packet. Other recipient devices S1, S2, and S3 can also receive packet 429 if they are authorized to receive packets from other recipient devices. This multi-cast multi-poll process can be repeated every time broadcaster device M desires to check whether recipient devices can receive packets sent by broadcaster device M. Additionally or alternatively, the multi-cast multi-poll process can be performed on scheduled periods. Also, it is noted that although only one broadcaster device and four recipient devices are shown, any number of broadcaster devices and recipient devices can be used.

In the embodiment of FIG. 4b, each packet transmitted by broadcaster device M and each recipient device S1, S2, S3, and S4 can have a fixed length time period of T5, which could be the same for all devices (e.g., each packet has a fixed length in terms of data, payload, etc. that is included in the packet). This fixed length time period of packets (e.g., payload) can be pre-negotiated. Accordingly, even if a device does not have enough information to fill up the pre-negotiated packet size, that device can send arbitrary information (e.g. dummy data) in addition to information (actual data) it wants to send out to fill the fixed size of the packet. Also, according to this example, the time difference between the end of one packet transmission (and/or packet reception) and the beginning of another can also be a fixed length time period T6. According to one example, fixed time period T6 is t_ifs, which is inter-frame space timing defined in BLE standard, which is 150 μs.

Figure 4C:
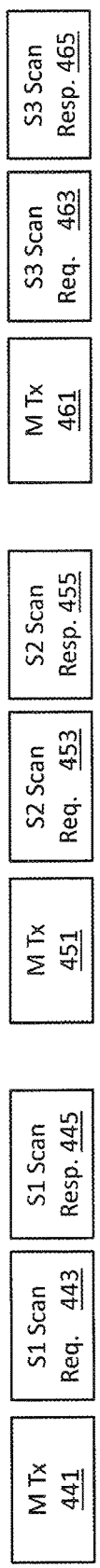
FIG. 4c illustrates a timing of packet transmission and reception for pre-negotiation according to another exemplary embodiment of the present disclosure.

FIG. 4c illustrates a timing of packet transmission and reception for pre-negotiation according to another exemplary embodiment of the present disclosure. According to this example, the X axis represents time and the Y axis represents packets sent and received by the broadcaster device and/or recipient devices. The timing diagram 440 is described with continued reference to FIGS. 1-3. The steps of timing diagram 440 are not limited to the order described below, and the various steps may be performed in a different order.

According to one example, broadcaster device M is configured to transmit packets 441, 451, and 461 to recipient devices S1, S2, and S3, respectively, before the multi-cast multi-poll process has started, to prepare the recipient devices for the multi-cast multi-poll process. According to one example, broadcaster device M is configured to transmit packets 441, 451, and 461 to the recipient devices to let the recipient devices know about the order and respective time intervals that the recipient devices are to transmit their packets, the time between each transmission, and whether other recipient devices are authorized to receive packets sent by another recipient devices, the characteristics of the multi-cast multi-poll packets transmitted by broadcaster device, etc.

According to this embodiment, broadcaster device M can send a packet 441 to recipient devices S1. The packet 441 can include information needed for the multi-cast multi-poll process. In one example, packet 441 can include the address of broadcaster device M. According to one example, recipient devices S1 can send a packet 443 acknowledging the receipt of packet 441. Additionally or alternatively, recipient device S1 can send a scan request packet 443 to broadcaster device M acknowledging the receipt of packet 441 and requesting for some data and/or information from broadcaster device M. In one example, scan request packet 443 can include both addresses of broadcaster device M and recipient device S1. In response to scan request packet 443, broadcaster device M can transmit a scan response packet 445 to recipient device S1. Scan response packet 445 can include the data and/or information that recipient device S1 requested. In one example, scan response packet 445 can include the address of broadcaster device M. In one example, before sending the scan response 445, broadcaster device M can check the address of recipient device S1 (received in scan request packet 443) to determine whether recipient device S1 is in broadcaster device M service range. The range and/or location of recipient devices S1-S4 can be stored in a memory, such as for example, memory 203. If recipient device S1 is not in broadcaster device M service range, broadcaster device M would not transmit scan response packet 445. Although exemplary embodiment of FIG. 4c is shown with scan response packet 445, it is noted that in some embodiments the pre-negotiation process between broadcaster device M and recipient device S1 can only include packets 441 and 443.

After broadcaster device M transmits the pre-negotiation information to recipient device S1, broadcaster device M will transmit the pre-negotiation information to recipient device S2 using one or more packets 451, 453, and 455. This process is similar to the process discussed above with respect to recipient device S1, and therefore, its details are not repeated. Similarly, after broadcaster device M transmits the pre-negotiation information to recipient device S2, broadcaster device M will transmit the pre-negotiation information to recipient device S3 using one or more packets 461, 463, and 465. This process is similar to the process discussed above with respect to recipient device S1, and therefore, its details are not repeated. It is noted that although three recipient devices are shown in FIG. 4c, this pre-negotiation process can include any number of broadcaster and recipient devices.

The pre-negotiation process is not limited to what is described. The pre-negotiation information can also be exchanged via connection schemes as described in BLUETOOTH/BLE standards, which are incorporated herein by reference.

Figure 5:
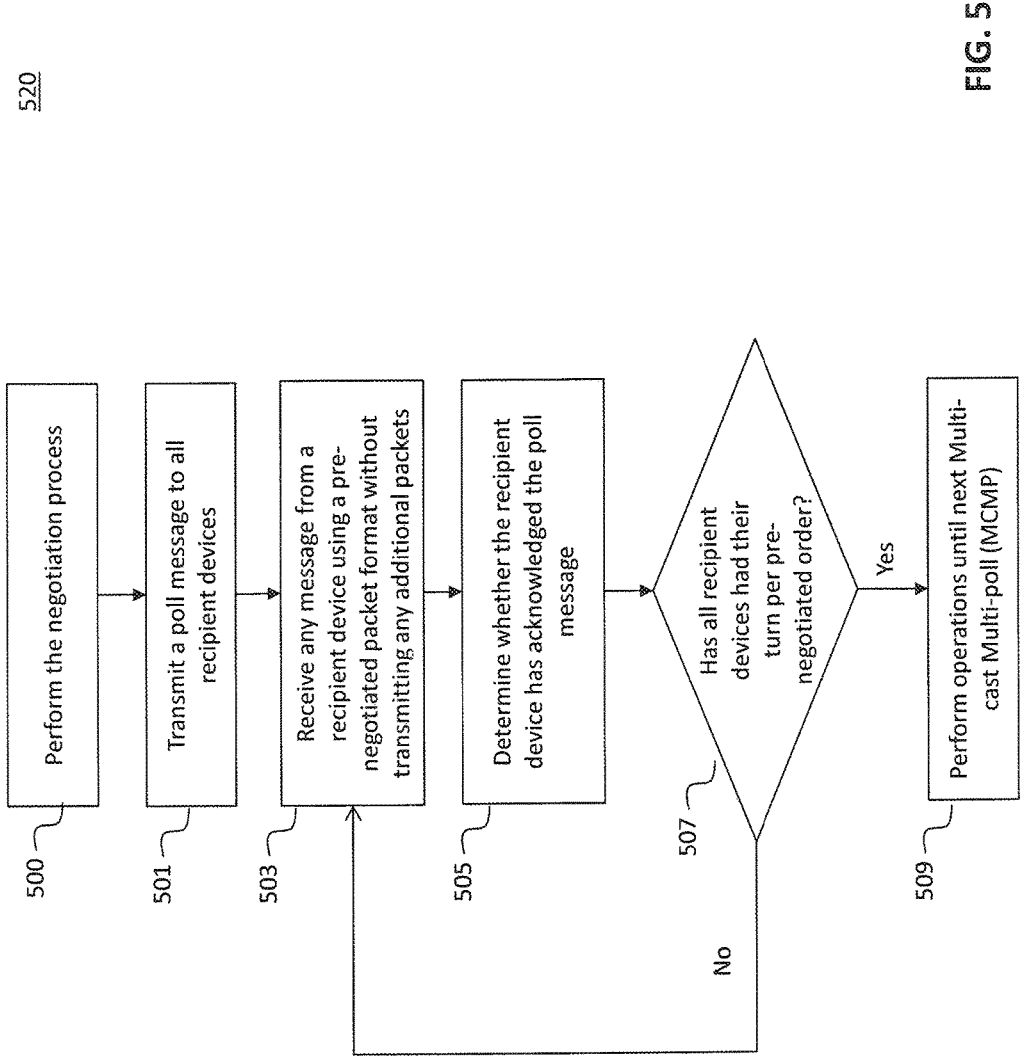
FIG. 5 illustrates a flowchart of a multi-cast multi-pole method performed by a broadcaster device in accordance with an exemplary embodiment of the present disclosure.

FIG. 5 illustrates a flowchart 520 of a multi-cast multi-pole method performed by a broadcaster device in accordance with an exemplary embodiment of the present disclosure. The method of flowchart 500 is described with continued reference to FIGS. 1-4. For example, the flowchart 520 can be implemented using the controller 201 and the transceiver 207 of the broadcaster device 103. The steps of the method of flowchart 520 are not limited to the order described below, and the various steps may be performed in a different order. Further, in embodiments, two or more steps of the method of flowchart 520 may be performed simultaneously with each other.

The method of flowchart 520 begins at step 500 where the negotiation process is performed (e.g., before the multi-cast multi-poll process), as discussed, for example, with respect to FIG. 4c. The negotiation process can be performed before start of each multi-cast multi-poll scheme, when a change in the recipient device(s) and/or broadcaster device is detected, at scheduled periods, etc.

At step 501, a broadcaster device (such as broadcaster device 103 of FIGS. 1 and 2 and/or broadcaster device M of FIGS. 4a, 4b, and 4c) transmits a poll message to all the recipient devices (such as recipient devices 101 of FIGS. 1 and 3 and/or recipient devices S1-S4 of FIGS. 4a, 4b, and 4c.) In one example, the poll message transmitted in step 501 can include packets 401 and/or 421 of FIGS. 4a and/or 4b. After transmitting the poll message, in step 503 the broadcaster device is configured to "listen" for, and receive, any message from the recipient devices based on a pre-negotiated order, corresponding time intervals, and a pre-negotiated packet format. The broadcaster device "listens" for, and receives, any message from the recipient devices based on the pre-negotiated order without transmitting any additional poll messages and/or any additional packets to the recipient devices until all the recipient devices in the pre-negotiated schedule have had their turn to respond. For example, in step 503, broadcaster device M can be configured to receive packet 403 and/or packet 423 from recipient device S1 at its corresponding time interval. In step 505, the broadcaster device can determine whether the particular recipient device (that had the turn to respond based on the pre-negotiated order) has acknowledged the poll message during its scheduled time interval. Additionally, the broadcaster device can determine whether that particular recipient device has transmitted additional data and/or information during its scheduled time interval.

In step 507, the broadcaster device can determine whether all the recipient devices had their turn per the pre-negotiated order in responding to the poll message. If not, method 520 can go back to step 503 where the broadcaster device would be configured to "listen" for and receive any message from the next recipient device per the pre-negotiated order during the scheduled time interval for the next recipient device. However, if at step 509, the broadcaster device determines that all the recipient devices have had their turn, the broadcaster device can perform its usual operation until the next time the broadcaster device would run the multi-cast multi-poll scheme.

Figure 6:
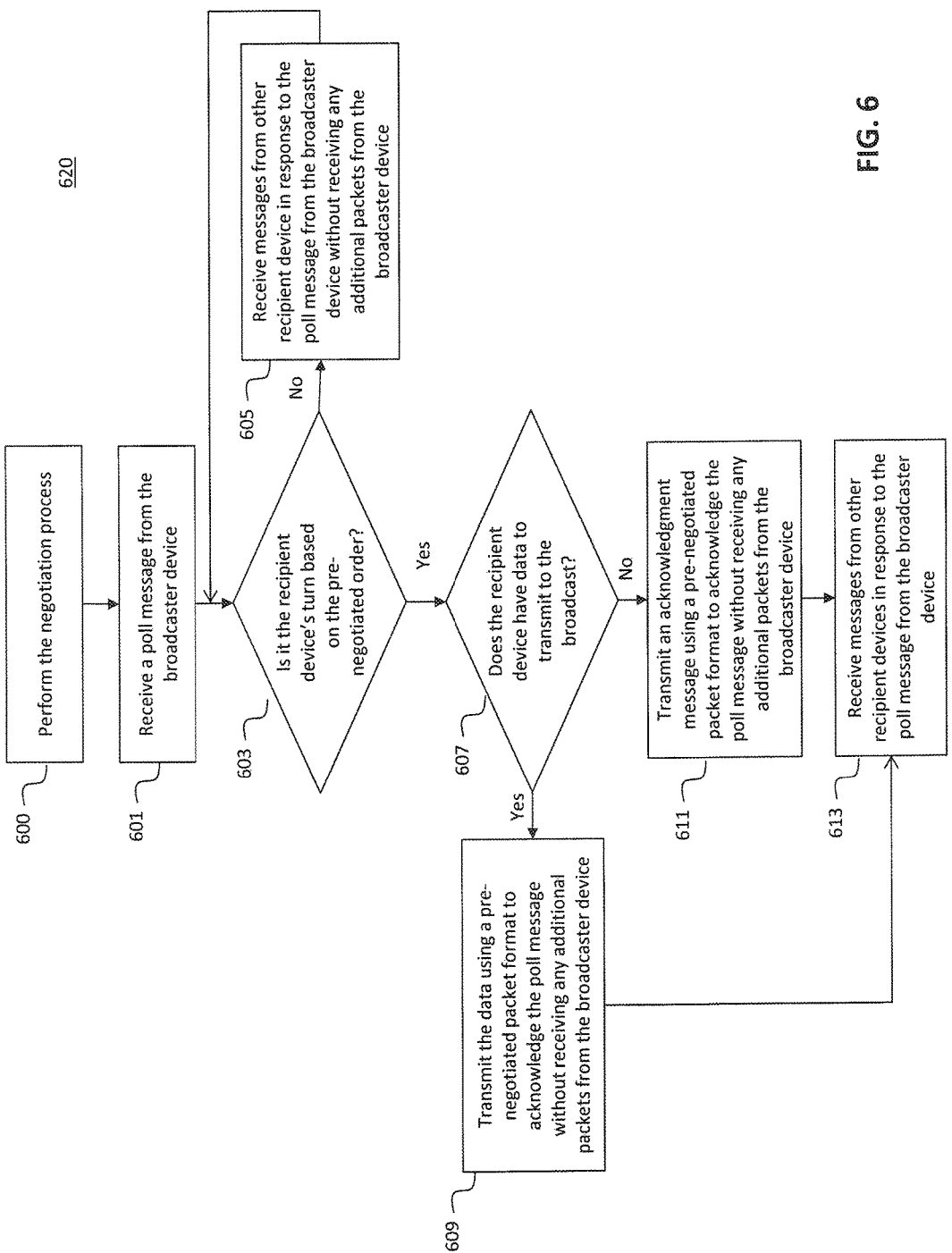
FIG. 6 illustrates a flowchart of a multi-cast multi-pole method performed by a recipient device in accordance with an exemplary embodiment of the present disclosure.

FIG. 6 illustrates a flowchart 620 of a multi-cast multi-pole method performed by a recipient device in accordance with an exemplary embodiment of the present disclosure. The method of flowchart 620 is described with continued reference to FIGS. 1-4. For example, the flowchart 620 can be implemented using the controller 301 and the transceiver 307 of the broadcaster device 101. The steps of the method, of flowchart 620 are not limited to the order described below, and the various steps may be performed in a different order. Further, two or more steps of the method of flowchart 620 may be performed simultaneously with each other.

The method of flowchart 620 begins at step 600 where the negotiation process is performed (e.g., before the multi-cast multi-poll process), as discussed, for example, with respect to FIG. 4c. The negotiation process can be performed before start of each multicast multi-poll scheme, when a change in the recipient device(s) and/or broadcaster device is detected, at scheduled periods, etc.

At step 601, a recipient device (such as recipient devices 101 of FIGS. 1 and 3 and/or recipient devices S1-S4 of FIGS. 4a, 4b, and 4c) receive a poll message from a broadcaster device (such as broadcaster device 103 of FIGS. 1 and 2 and/or broadcaster device M of FIGS. 4a, 4ab, and 4c.) In this example, the recipient device would acknowledge the receipt of the poll message so that the broadcaster device would know that the recipient device has received the poll message. According to one example, at step 603, the recipient device determines whether it is its turn to transmit an acknowledgment message in response to the poll message, e.g. during its scheduled time interval. In one example, the recipient device makes the determination based on the pre-negotiated order discussed above. If the recipient device determines that it is not its turn to respond to the poll message, the recipient device will not respond and instead at step 605, the recipient device "listens" for and receives messages from other recipient devices in response to the poll message. The recipient device "listens" for and receives messages from other recipient devices without receiving any additional poll messages and/or any additional packets from the broadcaster device until all the recipient devices in the pre-negotiated schedule have had their turn, to respond.

If the recipient device determines that it is its turn to respond to the broadcaster device, at step 607, the recipient device determines whether it has some data and/or information that the recipient device wants to transmit to the broadcaster device and/or other recipient devices. If the recipient device has data and/or information to transmit to the broadcaster device (e.g., in addition to acknowledging the receipt of the poll message) and/or other recipient devices, at step 609, the recipient device transmits the additional data and/or information to the broadcaster device and/or other recipient devices in a pre-negotiated packet format, and during its scheduled time interval. In one example, this transmitted data can be considered as the acknowledgement of the poll message. The recipient device transmits the additional data and/or information without receiving any additional poll messages and/or any additional packets from the broadcaster device until all the recipient devices in the pre-negotiated schedule have had their turn to respond. If the recipient device has no data or information to transmit to the broadcaster device, the recipient device can transmit an acknowledgment message at step 611 during its scheduled time interval using a pre-negotiated packet format to acknowledge the poll message. The recipient device transmits acknowledgment message without receiving any additional poll messages and/or any additional packets from the broadcaster device until all the recipient devices in the pre-negotiated schedule have had their turn to respond. According to one example, packets 403, 405, 407, or 409 of FIG. 4*a* or packets 423, 425, 427, or 429 of FIG. 4*b* are examples of messages sent in steps 605 and/or 607.

After both steps 609 and 611, the method 620 would move to step 613, where the recipient device "listens" for and receives messages from other recipient devices in response to the poll message. The recipient device "listens" for and receives messages from other recipient devices without receiving any additional poll messages and/or any additional packets from the broadcaster device until all the recipient devices in the pre-negotiated schedule have had their turn to respond. If the recipient device is the last recipient device in the pre-negotiated order and/or all the recipient devices in the pre-negotiated schedule have had their turn to respond to the poll message, the recipient device can further listen to (e.g., receive) additional poll message from the broadcaster device.

According to one exemplary embodiment, the multi-cast multi-poll method discussed above can be performed using frequency hopping. According to this example, multiple frequency channels could be used for transmission from the broadcaster device(s) to the recipient device(s) and/or for transmission from the recipient device(s) to broadcaster device(s). In one example, BLE standard can use frequency channels 37, 38, and 39 as advertising channels for frequency hopping. However, the multi-cast multi-poll method discussed above can use more frequency channels and/or different diversity of frequency channels for frequency hopping in order to, for example, reduce collision and radio frequency (RF) jamming. In one example, the frequency hopping method can include Frequency Hopping Spread Spectrum (FHSS), Direct-sequence spread spectrum, etc. Therefore, in one example, more channels in the BLE and/or BLUETOOTH standards can be used for the multi-cast multi-poll method discussed above, instead of the three channels designated by the BLE standard. According to this example, the hopping sequence can be shared between the broadcaster device(s) and the recipient device(s). In one example, the hopping sequence can be negotiated during the negotiations between the broadcaster device(s) and the recipient device(s). In one example, the frequency hopping can be implemented at firmware level.

According to one example, each of the broadcaster device(s) and the recipient clevice(s) can have a unique access code. This access code, which can be used as an address of the device, and inserted in packets transmitted by each of the broadcaster device(s) and the recipient device(s). For example, a packet transmitted by a broadcaster device and/or a recipient device can include a preamble, the access code, and the data to be transmitted. According to this example, this access code could be unique to each device to decrease the possibility of collision. The access codes can be communicated between the broadcaster device(s) and the recipient device(s) during the negotiations such that the devices communicating with each other know the access codes. These access codes can be different than advertising/scan access codes used in BLE and/or BLUETOOTH standards. The access code can be updated during the new negotiation process.

According to one example, the broadcaster device is configured to reshuffle the order of the recipient devices if one or more recipient devices is disconnected. For example, if recipient device S2 in FIGS. 4*a* and/or 4*b* is disconnected, broadcaster device M is configured to change the order of the recipient devices to, for example, S1, S3, S4 such that no gap would exist in the recipient devices' transmissions. According to one example, after a recipient device is disconnected, the broadcaster device can send out a message to the remaining recipient devices to inform them of the new order for the recipient devices and their corresponding response time intervals. Additionally or alternatively, the broadcaster device can initiate a new negotiation process to re-negotiate the order of the recipient devices. In one example, the broadcaster device can determine that a recipient device is disconnected if the broadcaster device does not receive any acknowledgment message from the recipient device. Alternatively, the broadcaster device can determine that the recipient device will be disconnected if the recipient device sends a message to the broadcaster device indicating that the recipient device will disconnect. In this case, the other recipient devices also receive the disconnection message. According to this example, the remaining recipient devices and the broadcaster device can reshuffle the order without a message from the broadcaster device. In one example, the recipient device being disconnected can be caused by the recipient device being turned off, the recipient device leaving the communication range of the broadcaster device, etc.

Although exemplary methods are discussed above regarding the negotiating the new order, how to determine the recipient device is disconnected, and what disconnection can include, it is noted that other methods can be used to achieve these goals.

The disclosure is also directed to computer program products comprising instructions stored on any computer useable medium. Such instructions, when executed in one or more data processing device, causes a data processing device(s) to operate as described herein. Embodiments of the disclosure employ any hardware computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device)

It will be apparent to persons skilled in the relevant art(s) that various elements and features of the present disclosure, as described herein, can be implemented in hardware using analog and/or digital circuits, through the execution of instructions by one or more general purpose or special-purpose processors, or as a combination of hardware and computer instructions.

FIG. 7 illustrates an example computer system 700 in which the present disclosure, or portions thereof, can be implemented as computer-readable code. For example, all or portions of methods 520 and 620 can be implemented by computer system 700. Various embodiments of the disclosure are described in terms of this example computer system 700. After reading this description, it will become apparent to a person skilled in the relevant art how to implement the disclosure using other computer systems and/or computer architectures.

Computer system 700 includes one or more processors, such as processor 704. Processor 704 can be a special purpose or a general purpose processor. Processor 704 is connected to a communication infrastructure 706 (for example, a bus or network).

Computer system 700 also includes a main memory 708, preferably random access memory (RAM), and may also include a secondary memory 710. Secondary memory 710 may include, for example, a hard disk drive 712, a removable storage drive 714, and/or a memory stick. Removable storage drive 714 may comprise a floppy disk drive, a magnetic tape drive, an optical disk drive, a flash memory, or the like. The removable storage drive 714 reads from and/or writes to a removable storage unit 718 in a well-known manner. Removable storage unit 718 may comprise a floppy disk, magnetic tape, optical disk, etc. that is read by and written to by removable storage drive 714. As will be appreciated by persons skilled in the relevant art(s), removable storage unit 718 includes a computer usable storage medium having stored therein computer instructions and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 that allow computer instructions and data to be transferred from the removable storage unit 722 to computer system 700.

Computer system 700 may also include a communications interface 724. Communications interface 724 allows computer instructions and data to be transferred between computer system 700 and external devices. Communications interface 724 may include a modem, a network interface (such as an Ethernet card), a communications port, a PCM-CIA slot and card, or the like. Computer instructions and data transferred via communications interface 724 are in the form of signals that may be electronic, electromagnetic, optical, or other signals capable of being received by communications interface 724. These signals are provided to communications interface 724 via a communications path 726. Communications path 726 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 718, removable storage unit 722, and a hard disk installed in hard disk drive 712. Signals carried over communications path 726 can also embody the logic described herein. Computer program medium and computer usable medium can also refer to memories, such as main memory 708 and secondary memory 710, which can be memory semiconductors (e.g. DRAMs, etc.). These computer program products are means for providing computer instructions to computer system 700.

Computer programs or instructions (also called computer control logic) are stored in main memory 708 and/or secondary memory 710. Computer programs may also be received via communications interface 724. Such computer programs, when executed, enable computer system 700 to implement the present disclosure as discussed herein. In particular, the computer programs, when executed, enable processor 704 to implement the processes of the present disclosure. Accordingly, such computer programs represent controllers of the computer system 700. Where the disclosure is implemented using computer instructions, the instructions may be stored in a computer program product and loaded into computer system 700 using removable storage drive 714, interface 720, hard drive 712 or communications interface 724.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure.

Embodiments described herein may be implemented in hardware (e.g., circuits), firmware, computer instructions, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and other hardware devices. Further, firmware, computer instructions, and routines may be described herein as performing certain actions. However, it should be appreciated that such descriptions are merely for convenience and that such actions in fact results from computing devices, processors, controllers, or other devices executing the firmware, routines, instructions, etc. Further, any of the implementation variations may be carried out by a general purpose computer.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventors, and thus, are not intended to limit the present disclosure and the appended claims in any way.

The present disclosure has been described above with the aid of functional building, blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. A broadcaster communication device, comprising:
a transceiver configured to communicate with a plurality of recipient communication devices; and
a controller configured to:
transmit a packet to the plurality of recipient communication devices using the transceiver;
receive, at predefined time intervals, responses from the plurality of recipient communication devices according to a pre-negotiated order without transmitting any additional packets;
determine that one of the plurality of recipient communication devices is disconnected, resulting in a remaining number of the plurality of recipient communication devices that are connected; and
reorganize the pre-negotiated order of the remaining number of the plurality of recipient communication devices based on the determination that one of the plurality of recipient communication devices is disconnected.

2. The broadcaster communication device of claim 1, wherein the transceiver communicates with the plurality of recipient communication devices over a Bluetooth Low Energy (BLE) protocol.

3. The broadcaster communication device of claim 1, wherein the predefined time intervals have a same time period length.

4. The broadcaster communication device of claim 1, wherein the predefined time intervals have different time period lengths.

5. The broadcaster communication device of claim 1, wherein the broadcaster communication device and each of the plurality of recipient communication devices have a unique access code.

6. The broadcaster communication device of claim 1, wherein the controller is further configured to transmit negotiation packets to the plurality of recipient communication devices to inform the plurality of recipient communication devices of the pre-negotiated order.

7. A recipient communication device, comprising:
a transceiver configured to communicate with a broadcaster communication device; and
a controller configured to:
receive a packet from the broadcaster communication device using the transceiver; and
transmit, at a predefined time interval based on a pre-negotiated order, a response to the broadcaster communication device without receiving any additional packets from the broadcaster communication device;
wherein the pre-negotiated order of a remaining number of the plurality of recipient communication devices is reorganized based on a determination that one of the plurality of recipient communication devices is disconnected.

8. The recipient communication device of claim 7, wherein the controller is further configured to receive responses from other recipient communication devices in response to the packet from the broadcaster communication device.

9. The recipient communication device of claim 7, wherein the broadcaster communication device communicates with the recipient communication device over a Bluetooth Low Energy (BLE) protocol.

10. The recipient communication device of claim 7, wherein the broadcaster communication device and the recipient communication device have a unique access code.

11. The recipient communication device of claim 7, wherein the controller is further configured to receive a negotiation packet from the broadcaster communication device and determine the pre-negotiated order from the negotiation packet.

12. A method for a broadcaster communication device to communicate with a plurality of recipient communication devices, the method comprising:
transmitting a packet to the plurality of recipient communication devices;
receiving, at predefined time intervals, responses from the plurality of recipient communication devices according to a pre-negotiated order without transmitting any additional packets;
determining that one of the plurality of recipient communication devices is disconnected resulting in a remaining number of the plurality of recipient communication devices that are connected; and
reorganizing the pre-negotiated order of the remaining number of the plurality of recipient communication devices based on the determination that one of the plurality of recipient communication devices is disconnected.

13. The method of claim 12, wherein the transmitting the packet to the plurality of recipient communication devices includes transmitting the packet to the plurality of recipient communications devices using a transceiver operating according to a Bluetooth Low Energy (BLE) protocol.

14. The method of claim 12, further comprising:
transmitting negotiation packets to the plurality of recipient communication devices to inform them of the pre-negotiated order.

15. The method of claim 12, wherein the predefined time intervals have a same time period length.

16. The method of claim 12, wherein the predefined time intervals have different time period lengths.

17. A method for a recipient communication device to communicate with a broadcaster communication device, the method comprising:
receiving a packet from the broadcaster communication device; and transmitting, at a predefined time interval based on a pre-negotiated order, a response to the broadcaster communication device without receiving any additional packets from the broadcaster communication device, wherein the pre-negotiated order of a remaining number of the plurality of recipient communication devices is reorganized based on a determination that one of the plurality of recipient communication devices is disconnected.

18. The method of claim 17, further comprising:
receiving responses from other recipient communication devices in response to the packet from the broadcaster communication device.

19. The method of claim 18, further comprising:
receiving a negotiation packet from the broadcaster communication device to inform it of the pre-negotiated order.

20. The method of claim 19, further comprising:
sending an acknowledgement packet with a scan request packet to the broadcaster communication device in response to receiving the negotiation packet.

* * * * *